(12) United States Patent
Gupta et al.

(10) Patent No.: US 11,221,397 B2
(45) Date of Patent: Jan. 11, 2022

(54) TWO-DIMENSIONAL FFT COMPUTATION

(71) Applicant: TEXAS INSTRUMENTS INCORPORATED, Dallas, TX (US)

(72) Inventors: Pankaj Gupta, Rajasthan (IN); Karthik Ramasubramanian, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 354 days.

(21) Appl. No.: 16/376,515

(22) Filed: Apr. 5, 2019

(65) Prior Publication Data
US 2020/0319296 A1    Oct. 8, 2020

(51) Int. Cl.
*G01S 7/35* (2006.01)
*G06F 17/14* (2006.01)
*H04L 27/26* (2006.01)
*G06F 17/16* (2006.01)

(52) U.S. Cl.
CPC ............ *G01S 7/352* (2013.01); *G06F 17/142* (2013.01); *H04L 27/265* (2013.01); *G01S 7/356* (2021.05); *G06F 17/141* (2013.01); *G06F 17/16* (2013.01); *H04L 27/263* (2013.01)

(58) Field of Classification Search
CPC .. G06F 17/142; G06F 9/30036; G06F 9/3001; G06F 9/3016; G06F 15/8053; G06F 17/14; G06F 17/141; G06F 17/16; H04L 27/265; H04L 1/0045; H04L 1/0057; H04L 27/2626; H04L 27/2614; H04L 27/2628; H04L 27/263; H04L 2209/122; G01S 7/352; G01S 7/356

USPC ................ 708/404, 405, 406, 408, 409
See application file for complete search history.

(56) References Cited

U.S. PATENT DOCUMENTS

| | | | | |
|---|---|---|---|---|
| 4,821,224 A | * | 4/1989 | Liu | G06F 17/142 708/401 |
| 6,061,705 A | * | 5/2000 | Hellberg | G06F 17/142 708/408 |
| 7,702,712 B2 | * | 4/2010 | Krishnamoorthi | G06F 17/142 708/404 |
| 2004/0071079 A1 | * | 4/2004 | Han | G06F 17/142 370/210 |
| 2006/0167964 A1 | * | 7/2006 | Balakrishnan | G06F 17/142 708/404 |

(Continued)

*Primary Examiner* — Olumide Ajibade Akonai
(74) *Attorney, Agent, or Firm* — Brian D. Graham; Charles A. Brill; Frank D. Cimino

(57) ABSTRACT

A system includes a hardware accelerator configured to perform a two-dimensional (2D) fast Fourier transform (FFT) on an M×N element array. The hardware accelerator has $\log_2$ M×N pipeline stages including an initial group of $\log_2$ M stages and a final group of $\log_2$ N stages. Each stage includes a butterfly unit, a FIFO buffer coupled to the butterfly unit, and a multiplier coupled to the butterfly unit and to an associated twiddle factor table. The hardware accelerator also includes butterfly control logic to provide elements of the M×N element array to the initial group of stages in an N direction of the array, and twiddle factor addressing logic to, for the twiddle factor tables of the initial group of stages, apply an indexed entry of the twiddle factor table to the associated multiplier. The indexed entry begins as a first entry and advances by N entries after every N cycles.

16 Claims, 9 Drawing Sheets

(56) References Cited

U.S. PATENT DOCUMENTS

| | | | |
|---|---|---|---|
| 2011/0289130 A1* | 11/2011 | Igura | G06F 17/142 |
| | | | 708/404 |
| 2012/0166508 A1* | 6/2012 | Kim | G06F 17/142 |
| | | | 708/404 |
| 2014/0365547 A1* | 12/2014 | Kim | G06F 17/142 |
| | | | 708/404 |
| 2017/0363711 A1* | 12/2017 | Rao | G01S 13/34 |
| 2019/0120955 A1* | 4/2019 | Zhong | G01S 13/584 |
| 2020/0116850 A1* | 4/2020 | Santra | G01S 13/72 |

* cited by examiner

| | | | |
|---|---|---|---|
| $X_0(0)$ | $X_1(4)$ | $X_2(0)$ | $X_3(0)$ |
| $X_0(4)$ | $X_1(4)$ | $X_2(4)$ | $X_3(4)$ |
| $X_0(2)$ | $X_1(2)$ | $X_2(2)$ | $X_3(2)$ |
| $X_0(6)$ | $X_1(6)$ | $X_2(6)$ | $X_3(6)$ |
| $X_0(1)$ | $X_1(1)$ | $X_2(1)$ | $X_3(1)$ |
| $X_0(5)$ | $X_1(5)$ | $X_2(5)$ | $X_3(5)$ |
| $X_0(3)$ | $X_1(3)$ | $X_2(3)$ | $X3(3)$ |
| $X_0(7)$ | $X_1(7)$ | $X_2(7)$ | $X_3(7)$ |

505

ROW-WISE FINAL OUTPUT →

| | | | |
|---|---|---|---|
| $X(0,0)$ | $X(0,2)$ | $X(0,1)$ | $X(0,3)$ |
| $X(4,0)$ | $X(4,2)$ | $X(4,1)$ | $X(4,3)$ |
| $X(2,0)$ | $X(2,2)$ | $X(2,1)$ | $X(2,3)$ |
| $X(6,0)$ | $X(6,2)$ | $X(6,1)$ | $X(6,3)$ |
| $X(1,0)$ | $X(1,2)$ | $X(1,1)$ | $X(1,3)$ |
| $X(5,0)$ | $X(5,2)$ | $X(5,1)$ | $X(5,3)$ |
| $X(3,0)$ | $X(3,2)$ | $X(3,1)$ | $X(3,3)$ |
| $X(7,0)$ | $X(7,2)$ | $X(7,1)$ | $X(7,3)$ |

COLUMN-WISE FINAL OUTPUT ↓

| | | | |
|---|---|---|---|
| $X(0,0)$ | $X(0,2)$ | $X(0,1)$ | $X(0,3)$ |
| $X(4,0)$ | $X(4,2)$ | $X(4,1)$ | $X(4,3)$ |
| $X(2,0)$ | $X(2,2)$ | $X(2,1)$ | $X(2,3)$ |
| $X(6,0)$ | $X(6,2)$ | $X(6,1)$ | $X(6,3)$ |
| $X(1,0)$ | $X(1,2)$ | $X(1,1)$ | $X(1,3)$ |
| $X(5,0)$ | $X(5,2)$ | $X(5,1)$ | $X(5,3)$ |
| $X(3,0)$ | $X(3,2)$ | $X(3,1)$ | $X(3,3)$ |
| $X(7,0)$ | $X(7,2)$ | $X(7,1)$ | $X(7,3)$ |

TWO-DIMENSIONAL FFT COMPUTATION

SUMMARY

In accordance with at least one example of the disclosure, a system includes a hardware accelerator configured to perform a two-dimensional (2D) fast Fourier transform (FFT) on an M×N element array. The hardware accelerator has $\log_2$ M×N pipeline stages including an initial group of $\log_2$ M stages and a final group of $\log_2$ N stages. Each stage includes a butterfly unit, a first-in first-out (FIFO) buffer coupled to the butterfly unit, and a multiplier coupled to the butterfly unit and to an associated twiddle factor table. The hardware accelerator also includes butterfly control logic to provide elements of the M×N element array to the initial group of stages in an N direction of the array, and twiddle factor addressing logic to, for the twiddle factor tables of the initial group of stages, apply an indexed entry of the twiddle factor table to the associated multiplier. The indexed entry begins as a first entry and advances by N entries after every N cycles.

In accordance with another example of the disclosure, a system includes a hardware accelerator configured to perform a two-dimensional (2D) fast Fourier transform (FFT) on an M×N element array. The hardware accelerator includes $\log_2$ M×N pipeline stages including an initial group of $\log_2$ N stages and a final group of $\log_2$ M stages. Each stage includes a butterfly unit, a first-in first-out (FIFO) buffer coupled to the butterfly unit, and a multiplier coupled to the butterfly unit and to an associated twiddle factor table. The hardware accelerator also includes butterfly control logic configured to provide elements of the M×N array to the final group of stages in an M direction of the array, where an output of a last stage of the final group of stages is provided as an input to a first stage of the initial group of stages. The hardware accelerator also includes twiddle factor addressing logic configured to, for the twiddle factor tables of the initial group of stages, apply an indexed entry of the twiddle factor table to the associated multiplier. The indexed entry begins as a first entry and advances by M entries after every M cycles.

In accordance with yet another example of the disclosure, a method for performing a two-dimensional (2D) fast Fourier transform (FFT) on an M×N element array using a hardware accelerator having $\log_2$ M×N stages including an initial group of $\log_2$ M stages and a final group of $\log_2$ N stages includes receiving elements of the M×N array at the initial group of stages in an N direction of the array, and, for the initial group of stages, applying an indexed entry of a twiddle factor table associated with each stage to a multiplier associated with each stage. The indexed entry begins as a first entry and advances by N entries after every N cycles.

In accordance with a further example of the disclosure, a method for performing a two-dimensional (2D) fast Fourier transform (FFT) on an M×N element array using a hardware accelerator having $\log_2$ M×N stages including an initial group of $\log_2$ N stages and a final group of $\log_2$ M stages includes receiving elements of the M×N array at the final group of stages in an M direction of the array, coupling an output of a last stage of the final group of stages to an input of a first stage of the initial group of stages, and, for the initial group of stages, applying an indexed entry of a twiddle factor table associated with each stage to a multiplier associated with each stage. The indexed entry begins as a first entry and advances by M entries after every M cycles.

BRIEF DESCRIPTION OF THE DRAWINGS

For a detailed description of various examples, reference will now be made to the accompanying drawings in which:

FIG. 5b shows an example of intermediate and final output arrays associated with the hardware accelerator of FIG. 5a in accordance with various examples;

FIG. 7b shows an example of a final output array associated with the hardware accelerator of FIG. 7a in accordance with various examples;

DETAILED DESCRIPTION

Figure 1:
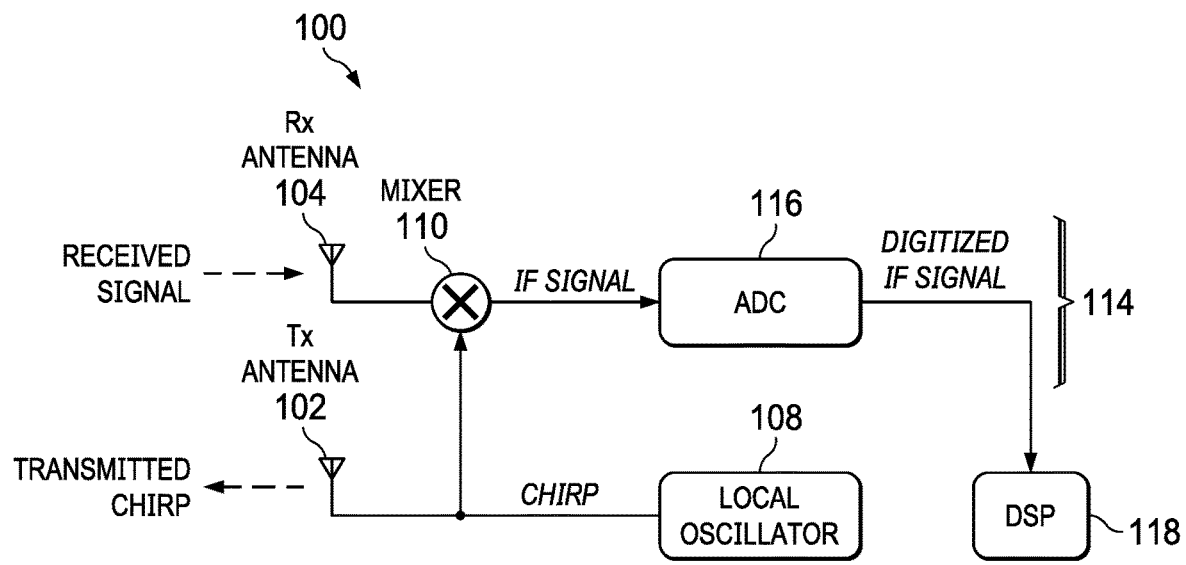
FIG. 1 shows a block diagram of a frequency-modulated continuous wave (FMCW) radar system in accordance with various examples.

Fast Fourier transforms (FFTs) are frequently required by various algorithms, such as for signal processing, radar tracking, image processing, and others. FFT computations may be implemented using software executed by a central processing unit (CPU) or a graphics processing unit (GPU), although this is computationally intensive and thus reduces the ability of the CPU or GPU to perform other tasks. Hardware accelerators may be employed to perform certain mathematical operations, such as FFTs, more efficiently than software executed on a general-purpose host processor such as a CPU or GPU. For example, Radix-2 Single-Delay Feedback (R2SDF) pipelined hardware architecture enables efficient computation of a one-dimensional (1D) FFT. However, certain applications may additionally require two-dimensional (2D) FFT computation as well. As will be explained in further detail below, performing a 2D FFT with a R2SDF hardware accelerator reduces the efficiency of its pipelined structure because the array of 2D data requires multiple passes (e.g., one for each dimension) to compute the 2D FFT.

One example of an application that benefits from efficient 2D FFT computation is a frequency-modulated continuous wave (FMCW) radar system. These FMCW systems may be embedded in multiple usage applications, such as industrial applications, automotive applications, and the like.

FMCW radar systems may transmit a frame containing a series of frequency ramps referred to as chirps. These chirps may be reflected by an object back to the FMCW radar system. After receipt of a signal containing the reflected chirps, the FMCW radar system may down-convert, digitize, and process the received signal to determine characteristics of the object. These characteristics can include range, velocity, angle of arrival, etc., of the object when the object is in view of the FMCW radar system.

In at least some FMCW radar systems, multiple sequences of chirps (e.g., such as consecutive sequences of equally spaced chirps) are transmitted and reflections of these chirps received to generate radar signals. After each sequence of chirps, there may be some idle time (e.g., inter-frame idle time) to allow for processing the radar signals resulting from the reflected chirps. The acquisition time of a sequence of chirps and the subsequent inter-frame idle time together may form a radar frame. In at least one example, the reflected signal received by each antenna of the FMCW radar system is mixed with the transmitted signal to generate an intermediate frequency (IF) signal that is filtered and digitized. Signal processing may then be performed on the resulting digital IF signals (e.g., one per receiving antenna in the FMCW radar system) to extract any one or more of the range, velocity, and/or angle of potential objects in the view of the radar. As will be explained further below, 2D FFT computation is important for determining the angle of arrival of an object in the view of the radar. Thus, improvements to 2D FFT computation speed improve the overall function of the FMCW radar system.

In examples of the present disclosure, a hardware accelerator is provided that performs a 2D FFT on an M×N element array in a pipelined fashion, rather than requiring multiple passes through the accelerator (e.g., one for each dimension). The hardware accelerator includes at least $\log_2$ M×N pipeline stages. In one example, the pipeline stages are split into an initial group of $\log_2$ M stages and a final group of $\log_2$ N stages. Control logic provides the elements of the M×N array to the initial group of stages in an N direction (or transpose direction) of the array. Through application of twiddle factor addressing logic, the initial group of stages effectively performs an M-point 1D FFT in a transpose direction, the result of which is then passed to the final group of stages that performs an N-point 1D FFT. The output of the final group of stages is thus a 2D FFT that is performed in a pipelined fashion rather than first performing a 1D FFT in one dimension, then reusing stage(s) of the hardware accelerator to perform a 1D FFT in the second dimension.

In another one example, the pipeline stages are split into an initial group of $\log_2$ N stages and a final group of $\log_2$ M stages. Control logic provides the elements of the M×N array to the final group of stages in an M direction (not a transpose direction) of the array. An output of the last stage of the final group of stages is provided as an input to a first stage of the initial group of stages. Thus, the final group of stages effectively performs an M-point 1D FFT, the result of which is passed to the initial group of stages. As will be explained further below, due to storage size of buffers associated with the initial group of stages, and through application of twiddle factor addressing logic, the initial group of stages effectively performs an N-point 1D FFT in a transpose direction. The output of the initial group of stages is thus a 2D FFT that is performed in a pipelined fashion rather than first performing a 1D FFT in one dimension, then reusing stage(s) of the hardware accelerator to perform a 1D FFT in the second dimension.

FIG. 1 shows a block diagram of an example FMCW radar system 100. The FMCW radar system 100 includes a transmit antenna 102 and a receive antenna 104. In the FMCW radar system 100, a local oscillator 108 generates frequency ramps, referred to as chirps, which are transmitted by the transmit antenna 102. For example, the local oscillator 108 is a voltage controlled oscillator (VCO) and the chirps are generated by linearly ramping a control voltage supplied to the VCO. The chirps are also provided to a mixer 110, which is coupled to the local oscillator 108. In at least one example, the FMCW radar system 100 transmits a 4 GHz bandwidth chirp that ramps from 77 GHz to 81 GHz. Multiple chirps are transmitted sequentially in a frame.

The transmitted radar signals are reflected and received by the receive antenna 104. The received radio frequency (RF) signals are mixed with chirps from the local oscillator 108 by a mixer 110 in a receive channel 114, to generate intermediate frequency (IF) signals. IF signals are also referred to as dechirped signals, beat signals, or raw radar signals. An analog-to-digital converter (ADC) 116 in the receive channel 114 digitizes the IF signals. The digital IF signals are sent by the ADC 116 to a digital signal processor (DSP) 118 for further processing. The DSP 118 may perform signal processing on the digital IF signals to extract the range and velocity of objects in view of the FMCW radar system 100. Range refers to the distance of an object from the FMCW radar system 100 and velocity refers to the speed of the object relative to the FMCW radar system 100.

To determine the range, the DSP 118 performs a range FFT on the digital IF signals corresponding to each chirp in a frame of chirps, to convert the data to the frequency domain. For each of M time samples in a chirp, the DSP 118 computes a range FFT, which yields M range results for the chirp. Thus, for a frame having N chirps, the range FFT generates a range-time array having N×M range values. In the range-time array, the M columns indicate the range values for samples at the same relative time across the N chirps.

To determine the velocity, the DSP 118 performs a Doppler FFT over the range values of the chirps in the frame, which generates a range-Doppler array. That is, the Doppler FFT is performed on each of the M columns of the N×M range-time array. The peaks in the N×M range-Doppler array correspond to the range and relative speed or velocity of objects. The combination of the range FFTs and the Doppler FFTs may be referred to as a two-dimensional (2D) FFT (or 2D FFT processing).

Figure 2:
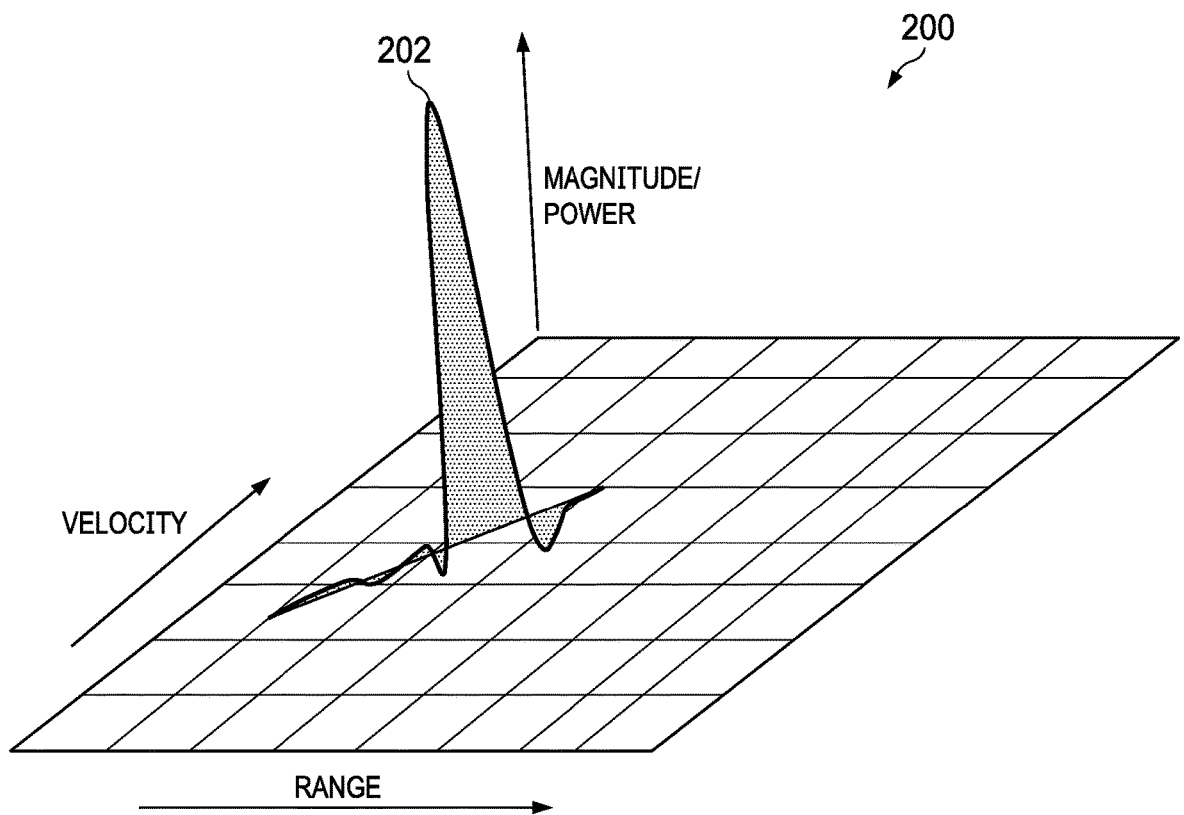
FIG. 2 shows a range-Doppler array in accordance with various examples.

FIG. 2 shows a result (range-Doppler array 200) of the 2D FFT processing on a frame of chirps, which resolves a scene into a 2D grid with range and velocity on the two axes. The cells in this grid are commonly referred to as bins. A peak 202 in a curve in the 2D grid indicates an object in the scene. The coordinates of such a peak 202 in the curve in the range-velocity plane indicate the range and velocity of the object. The DSP 118 or other processor performs an object detection algorithm to detect peaks 202 in the 2D FFT grids. Additionally, the DSP 118 may track the detected objects across frames.

Multiple objects with the same range and relative velocity with respect to the FMCW radar system 100, but at different angles, may be placed in the same bin in the 2D grid. In some examples, two or more transmit antennas generate chirps that are interleaved within a frame to discriminate multiple objects in the same bin by determining the angle of the objects. In other examples, two or more receive antennas may be used to discriminate multiple objects in the same bin by determining the angle of the objects. In some examples, multiple antennas may exist in both the azimuth and elevation planes, forming a radar antenna array. The use of multiple transmit and/or multiple receive antennas improves the angle resolution capability of the radar system. A third FFT, an angle FFT, is performed across the 2D FFT grids (one 2D FFT grid being computed for each azimuth-elevation antenna pair), to estimate and angle-of-arrival for the objects. Accordingly, objects with similar range and velocity, but different angles-of-arrival are resolved. The angle-of-arrival may be derived from a combination of the azimuth angle and the elevation angle.

The FMCW radar system 100 is thus capable of measuring the range (distance from the radar), velocity (relative velocity with respect to the radar) and angle-of-arrival of objects (with multiple azimuth and elevation antennas) in the field of view of the radar.

The foregoing FMCW radar system 100 example is one application in which efficient 2D FFT computation is helpful, particularly to determine an angle-of-arrival of an object based on data from a radar antenna array including multiple azimuth and elevation antennas; however, the scope of this disclosure is not limited solely to FMCW radar system 100 2D FFT computation, but rather to any application in which 2D FFT computation is required using an existing hardware accelerator such as the R2SDF accelerator, which is described in further detail below.

Figure 3:
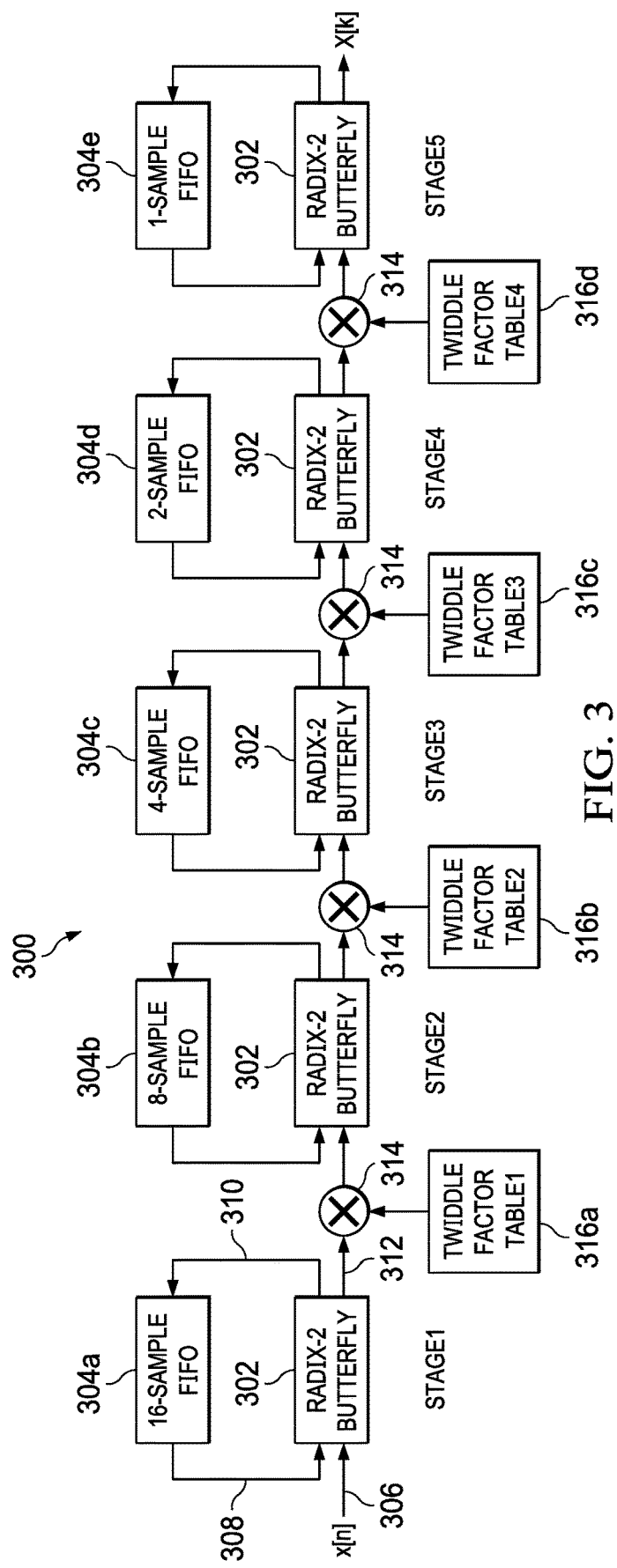
FIG. 3 shows a block diagram of a hardware accelerator in accordance with various examples.

FIG. 3 shows an exemplary R2SDF hardware accelerator 300. Although described with respect to a Radix-2 architecture in which hardware butterfly units are implemented as Radix-2 butterfly units, the examples of this disclosure may be applied to any Radix-R structure (e.g., utilizing Radix-R butterfly units). As shown, the R2SDF hardware accelerator 300 includes multiple stages, labeled Stage 1-5. Each stage includes a butterfly unit 302 coupled to a first-in first-out (FIFO) buffer 304. The butterfly units 302 for each stage are functionally the same, while the FIFO buffers 304a-e are similar in function but differ in their size. Referring to stage 1, the butterfly unit 302 includes a first input 306 that is either coupled to a memory (not shown for simplicity, but for example storing data upon which a FFT is to be performed) or to a previous stage output. The butterfly unit 302 includes a second input 308, which is the output of the FIFO buffer 304a. The butterfly unit 302 includes a first output 310, which is the input of the FIFO buffer 304a. Finally, the butterfly unit 302 includes a second output 312, which is provided as an input to a multiplier 314. The other input to the multiplier 314 is data from a twiddle factor table 316, which will be explained in further detail below. In the other stages, the connections between butterfly units 302 and the associated FIFO buffers 304b-e are as explained above.

For purposes of consistency in the following discussion, a R2SDF hardware accelerator 300 that has S stages is capable of performing a P-point 1D FFT, where $P=2^S$. Thus, in the example of FIG. 3, the R2SDF hardware accelerator 300 is capable of performing a 32-point 1D FFT.

The butterfly unit 302 is controlled to either operate in a bypass mode or in an add/subtract mode. In the bypass mode, the butterfly unit 302 passes the first input 306 to the first output 310 (i.e., to the input of the FIFO buffer 304a) and passes the second input 308 to the second output 312 (i.e., to the input of the multiplier 314). In the add/subtract mode, the butterfly unit 302 adds the first input 306 and the second input 308 and subtracts the first input 306 from the second input 308. The first output 310 is the difference, while the second output 312 is the sum. In another example, the first output 310 is the sum, while the second output 312 is the difference.

To demonstrate the functionality of a stage in the R2SDF hardware accelerator 300, Stage 1 is described performing a 1D FFT on 32 elements (i.e., a 32-point 1D FFT). In this example, the FIFO buffer 304a of Stage 1 is a 16-spot FIFO buffer 304a. During the first 16 cycles, the butterfly unit 302 is operated in bypass mode, which has the effect of filling the FIFO buffer 304a with the first 16 elements on which the 1D FFT is being computed. During the next 16 cycles, the butterfly unit 302 is operated in add/subtract mode. That is, in the $17^{th}$ cycle, the $1^{st}$ and the $17^{th}$ elements are added and subtracted. As explained above, the sum is passed on to the multiplier 314 while the difference is fed back into the now-empty first spot in the FIFO buffer 304a. This behavior continues until the $16^{th}$ and the $32^{nd}$ elements have been added and subtracted, at which point the butterfly unit 302 is operated again in bypass mode, feeding all of the subtracted values or differences from the FIFO buffer 304a through to the multiplier 314. Other stages operate in a similar manner, with the main difference being the number of cycles in which the butterfly units 302 are operated in bypass or add/subtract modes. For example, Stage 3 operates four cycles in each of the bypass and add/subtract modes, and so forth.

The twiddle factor tables 316 include twiddle factors stored in memory, for example read-only memory (ROM). The twiddle factor table 316 for Stage 1 includes 32 elements (e.g., to be applied to the 16 sums and 16 differences generated by the butterfly unit 302 during the 16 cycles in add/subtract mode and the subsequent 16 cycles in bypass mode), while the twiddle factor table 316 for Stage 3 includes 8 elements, and so on. The values in such twiddle factor tables 316 are known in the art. For example, when the output from the butterfly unit 302 is a summed output, the twiddle factor values are 1, effectively bypassing the multiplier 314. Then, when the output from the butterfly unit 302 is a subtracted output, the twiddle factor values are complex numbers, which are multiplied with the subtracted output by the multiplier 314.

While the butterfly unit 302 is operated in add/subtract mode, separate addressing logic determines which twiddle factor is to be applied. For example, when the butterfly unit 302 is operated in bypass mode, the output of the butterfly unit 302 corresponds to the subtracted values, and thus the complex twiddle factor values are applied to the multiplier 314. When the butterfly unit 302 is operated in add/subtract mode, the output of the butterfly unit 302 corresponds to the summed values, and thus the twiddle factor values of 1 are applied to the multiplier 314. Conventionally, the addressing logic applies the twiddle factors in a sequential order per cycle. For example, when the butterfly unit 302 is operated in add/subtract mode in a first cycle, the addressing logic applies the first twiddle factor of the twiddle factor table 316 to the multiplier 314; when the butterfly unit 302 is operated in add/subtract mode in a third cycle, the addressing logic applies the third twiddle factor of the twiddle factor table 316 to the multiplier 314; and so on.

Although the R2SDF hardware accelerator 300 of FIG. 3 is configured to perform a 32-point 1D FFT, the R2SDF hardware accelerator 300 can also perform 1D FFTs on fewer points by inserting input elements to different stages of the R2SDF hardware accelerator 300. For example, an 8-point 1D FFT is computed by inserting input elements from memory to the butterfly unit 302 of Stage 3, while a 4-point 1D FFT is computed by inserting elements from memory to the butterfly unit 302 of Stage 4.

Figure 4:
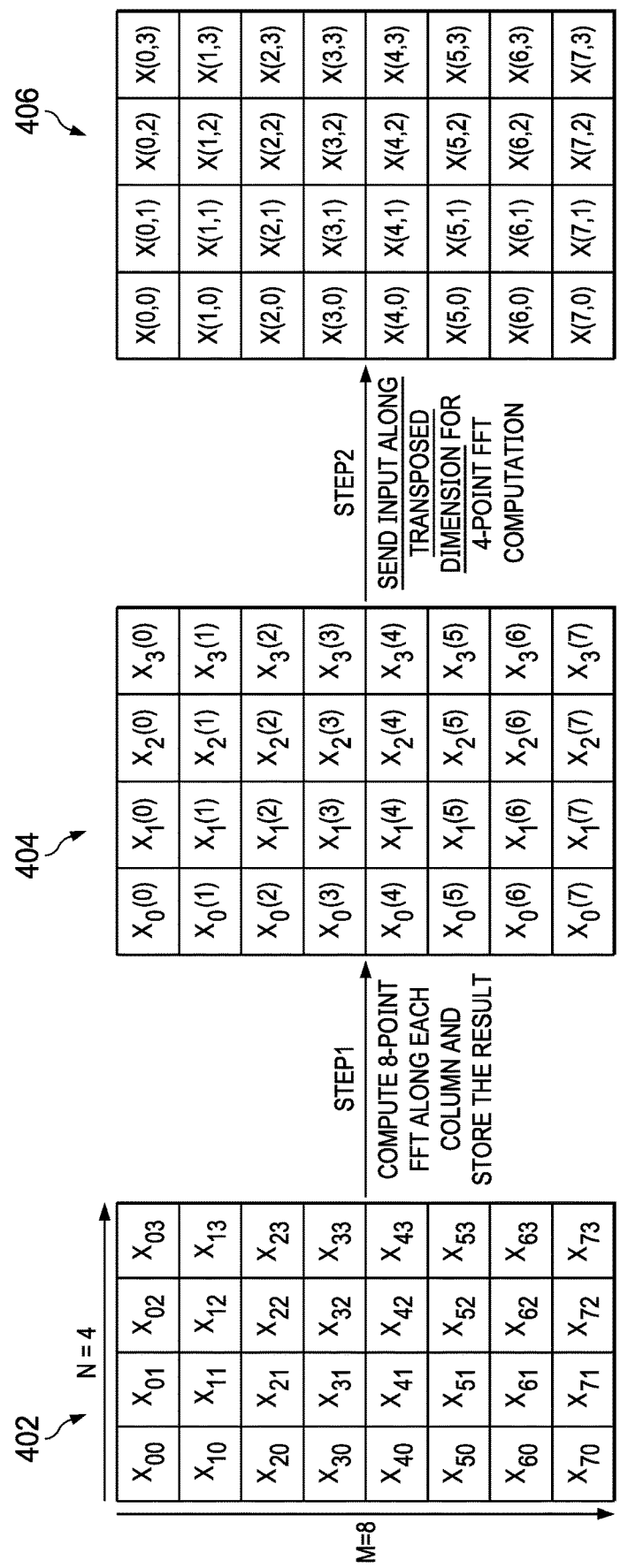
FIG. 4 shows an example of a two-dimensional fast Fourier transform performed using the hardware accelerator of FIG. 3 in accordance with various examples.

Referring to FIG. 4, a 2D FFT computation using the R2SDF hardware accelerator 300 of FIG. 3 is explained in further detail. Although the scope of this disclosure is not limited particularly to FMCW radar systems 100, that particular application is explained to provide further context. As explained above, once an object is identified by the FMCW radar system 100 (e.g., through range/velocity FFTs), in order to determine an angle of arrival of the identified object, a 2D FFT is performed across antenna pairs in the azimuth and elevation directions. In the example of FIG. 4, a radar antenna array includes eight antennas in the azimuth direction and four antennas in the elevation direction, resulting in an M×N array 402 of size 8×4. The values in the M×N array 402 correspond to amplitude/phase values for a particular antenna pair that correspond to the peak identified in the range-Doppler FFT explained above, and are notated as $x_{ij}$ for the ith row and jth column. The peak identified in the range-Doppler FFT will not change location across antennas, although its amplitude and phase does change. A 2D FFT is performed on the M×N array 402 to determine where the peak of the grid of complex amplitude/phase values lies, the location of which peak corresponds to the angle of arrival according to the layout of the antennas along the azimuth and elevation directions.

In a first step, a 1D FFT is computed along a first dimension (e.g., in the M direction), which is the same as computing an M-point 1D FFT across all N columns. That is, the M×N array 402 is fed into the butterfly unit 302 of Stage 3 to perform an 8-point FFT on each of the 4 columns, and the result is stored in memory as the array 404. It should be appreciated that when a FFT is computed in this way, the actual results (the output from Stage 5) are output in a bit-reversed manner (e.g., 000-000, 001-100, 010-010, 011-110, 100-001, 101-101, 110-011, 111-111). For example, prior to applying a bit-reversal algorithm, the first column of the array 404 is given by X(0), X(4), X(2), X(6), X(1), X(5), X(3), X(7) (omitting the 0 subscript for simplicity). Thus, in at least some examples, a bit-reversal algorithm is applied to the Stage 5 output prior to storing the array 404 in memory. In this example, the array 404 represents the output after the bit-reversal algorithm is applied. The values in the M×N array 404 are notated as Xj(i) for the ith element of the M-point 1D FFT output in the jth column.

In a second step, a 1D FFT is computed along a second dimension (e.g., in the N direction, or in a transposed dimension or fashion relative to the M direction), which is the same as computing an N-point 1D FFT across all M rows. That is, the M×N array 404 is fed into the butterfly unit 302 of Stage 4 to perform a 4-point FFT on each of the 8 rows, and the result is stored in memory as the array 406. As above, the array 406 represents the output of Stage 5 after the bit-reversal algorithm is applied. The values in the M×N array 406 are notated as X(i, j) for the 2D FFT output in the ith row and jth column.

In the example of FIG. 4, the butterfly units 302 of Stages 1 and 2 are not used, since first an 8-point 1D FFT is performed across columns (involving Stages 3-5), the result is stored to memory (e.g., after a bit-reversal algorithm is applied), and then a 4-point 1D FFT is performed across rows (involving Stages 4-5). Additionally, since the first (8-point in this example) 1D FFT must be completed prior to beginning the second (4-point in this example) 1D FFT, carrying out the 2D FFT of FIG. 4 reduces the benefits of the pipelined architecture of the R2SDF hardware accelerator 300.

Figure 5A:
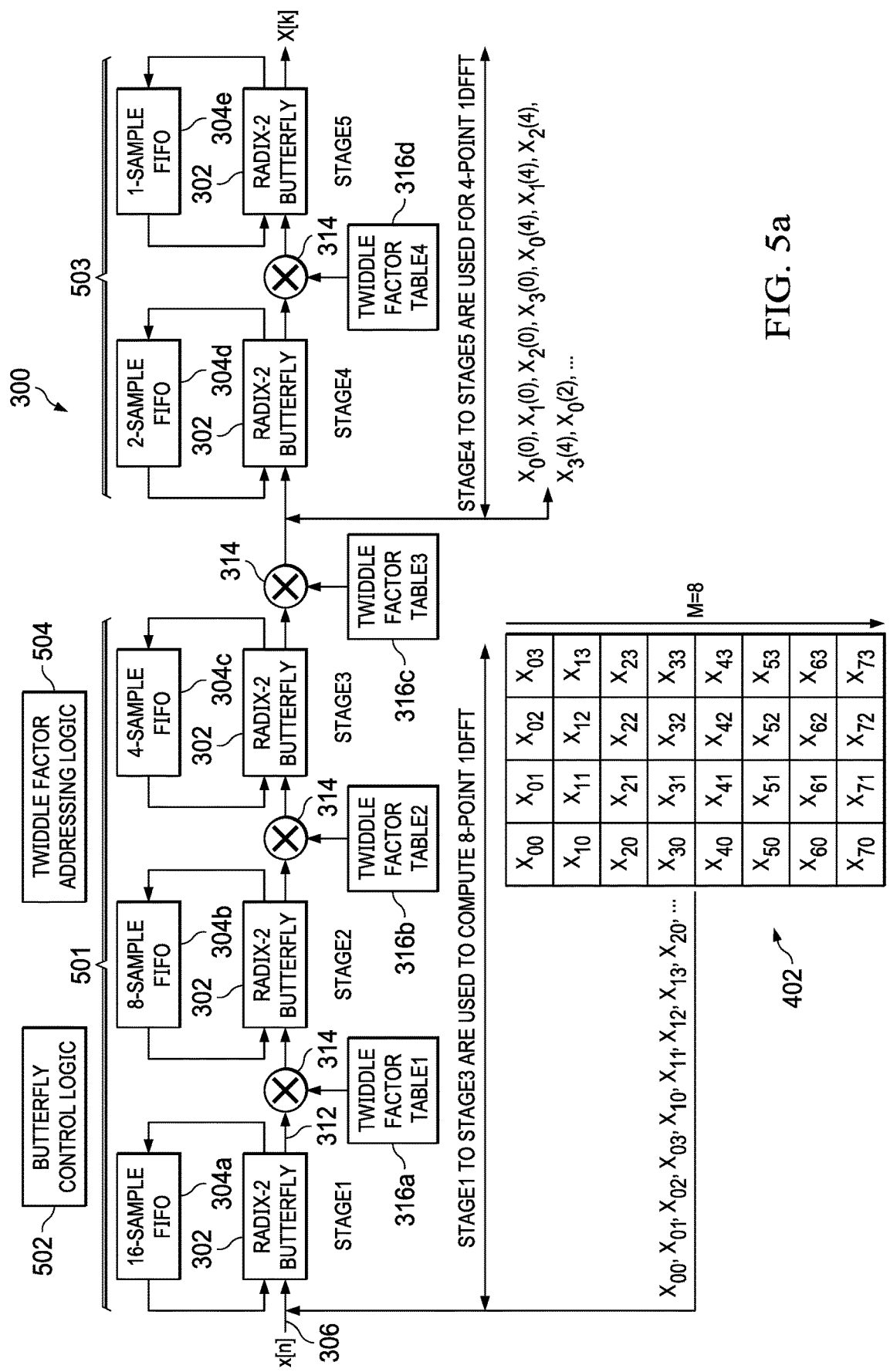
FIG. 5a shows the hardware accelerator of FIG. 3 including additional control logic in accordance with various examples.

FIG. 5a shows the R2SDF hardware accelerator 300 with modified butterfly control logic 502 and twiddle factor addressing logic 504 in accordance with examples of this disclosure. In particular, the R2SDF hardware accelerator 300 and associated logic 502, 504 are configured to perform a pipelined 2D FFT on an M×N array (e.g., M×N array 402) with a R2SDF hardware accelerator 300 having at least $\log_2$ M×N stages. In the example of FIG. 5a, as in FIG. 3, the R2SDF hardware accelerator 300 has five stages, and thus can perform a pipelined 2D FFT for M×N less than or equal to 32. In practice, however, the R2SDF hardware accelerator 300 may include many more stages, and thus is capable of performing a pipelined 2D FFT on larger arrays. For purposes of simplicity, here the R2SDF hardware accelerator 300 includes five stages as above, and the M×N array 402 on which the pipelined 2D FFT is performed is an 8×4 array 402.

Referring briefly back to the example of FIG. 4, when a 2D FFT is performed conventionally (i.e., not pipelined, but rather a 1D FFT in a first direction followed by a 1D FFT in a second, transpose direction), first an 8-point FFT is performed by feeding the array 402 into the butterfly unit 302 of Stage 3. Since the FIFO buffer 304c of stage 3 is a 4-spot buffer, the first four elements of the first column are initially stored in the FIFO buffer 304c as the butterfly unit 302 is operated in bypass mode. At this point, the butterfly unit 302 operates in add/subtract mode, and thus the first add/subtract operation is carried out on x00 and x40, while the second through fourth add/subtract operations are carried out on x10 and x50, x20 and x60, and x30 and x70, respectively. At this point, the butterfly unit 302 operates again in bypass mode to refill the FIFO buffer 304c with the first four elements of the second column. Then, the butterfly unit 302 operates in add/subtract mode to carry out similar add/subtract operations on the elements of the second column. This repeats for the third and fourth columns as well. Stages 4 and 5 operate in a similar manner, except with 2- and 1-spot FIFO buffers 304d, 304e and correspondingly shortened bypass and add/subtract cycles to produce the intermediate M×N array 404 (after applying a bit-reversal algorithm).

Returning to FIG. 5a, the $\log_2$ M×N stages of the R2SDF hardware accelerator 300 are split into an initial group of $\log_2$M stages and a final group of $\log_2$N stages, generally. In this specific example, where the M×N array 402 is an 8×4 array, this results in an initial group of 3 stages 501 and a final group of 2 stages 503. In this example, the initial group of stages 501 carries out the M-point 1D FFT, while the final group of stages 503 carries out the N-point 1D FFT. However, while the final group of stages 503 is configured with appropriate FIFO buffer size to perform the N-point 1D FFT (i.e., stages 4 and 5 are conventionally designed to carry out a N=4-point 1D FFT in this example), the initial group of stages 501 does not have the proper FIFO buffer size to carry out an M=8-point 1D FFT. For example, Stage 1 would conventionally be the first stage in carrying out a 32-point 1D FFT, while Stage 2 would be the first stage in carrying out a 16-point 1D FFT. Here, however, Stage 1 is used as the first stage to carry out an M=8-point 1D FFT.

In accordance with examples of this disclosure, the butterfly control logic 502 provides elements of the M×N array 402 to the initial group of stages 501 in a transpose fashion relative to the M direction of the array. That is, rather than as in FIG. 4, where an M-point 1D FFT was carried out by providing elements of the M×N array 402 in the M direction of the array 402, in this example the butterfly control logic 502 provides elements to the initial group of stages 501 in the N (or transpose to M) direction of the array 402.

In the example of FIG. 5a, in which the butterfly control logic 502 is configured to provide elements from the M×N array 402 to the initial group of $\log_2$M stages 501 in a transpose direction (i.e., the N direction of the array 402), the butterfly unit 302 is operated in bypass mode for the first 16 cycles as explained above, which fills the FIFO buffer 304a with the elements x00, x01, x02, x03, x10, . . . , x13, x20, . . . , x23, x30, . . . , and x33. Thus, on the $17^{th}$ cycle when the butterfly unit 302 switches to operate in add/subtract mode, the add/subtract operation is carried out on x00 and x40, similar to above. However, rather than subsequent add/subtract operations being carried out down the column (i.e., x10 and x50, x20 and x60, x30 and x70) as above, the subsequent add/subtract operations are carried out across rows due to the order in which the elements were provided to the butterfly unit 302 (and thus the FIFO buffer 304a) by the butterfly control logic 502. For example, second and subsequent add/subtract operations are between x01 and x41, x02 and x42, x03 and x43, etc.

Since these first four exemplary add/subtract operations are carried out on the first element pairs of each column (i.e., across a row), then at the end of Stage 3 the first four results will be $X_0(0)$, $X_1(0)$, $X_2(0)$, and $X_3(0)$, as shown in an intermediate array 505 in FIG. 5b, which also correspond to the elements of the first row of the array 404 in FIG. 4, which are notably the first elements that are fed into the butterfly unit 302 of Stage 4 when beginning to perform the N=4-point 1D FFT to complete the computation of the 2D FFT. The intermediate array 505 corresponds to the array 404 prior to the application of a bit-reversal algorithm. Thus, upon exiting the initial group of stages 501, the resulting elements are able to continue to be fed to the final group of stages 503, which operate conventionally to carry out the remaining N-point 1D FFT. In this way, a 2D FFT is computed on an M×N array 402 in a pipelined fashion (e.g., a single pass through the R2SDF hardware accelerator 300) in $\log_2$ M×N stages.

Similar to above, the intermediate array 505 is bit-reversed in the column direction, however not in the row direction. Thus, the array 505 need not be bit-reversed prior to being provided to the final group of stages 503 (the array 505 is not stored in memory), and results in an output from Stage 5, the last stage in the final group of stages 503, of a final output array 506. The final output array 506 is output in a row-wise direction. The final output array 506 is bit-reversed in both dimensions, and thus a 2D bit-reversal algorithm may be applied to the final output array 506 before further processing (e.g., to determine an angle-of-arrival of an object in FMCW radar system 100).

While FIG. 5a demonstrates how the butterfly control logic 502 providing elements from the M×N array 402 to the initial group of $\log_2$ M stages 501 in a transpose fashion allows for pipelined computation of a 2D FFT, the twiddle factor tables 316 for the initial group of stages 501, which are commonly stored in ROM, are designed for M×N-point 1D FFT computation. Thus, additional twiddle factor addressing logic 504 modifies the addressing of these twiddle factor tables 316 in the initial group of stages 501 to compensate for this disparity.

Conventionally, the twiddle factor table 316 for Stage 1 includes 32 twiddle factors, which are sequentially applied to the multiplier 314 once the butterfly unit 302 switches to add/subtract mode. That is, once sums (for the first 16 cycles following switching to add/subtract mode) and differences (for the next 16 cycles) are output at the second output 312, twiddle factors from the twiddle factor table 316 are sequentially applied. Similarly, the twiddle factor table 316 for Stage 2 includes 16 twiddle factors that are sequentially applied, and so on for the remaining Stages 3-5. The twiddle factor table 316 for the final stage, Stage 5 in this example, is not shown since the multiplication is by unity. That is, the output of the butterfly unit 302 of Stage 5 is the final output.

Figure 6:
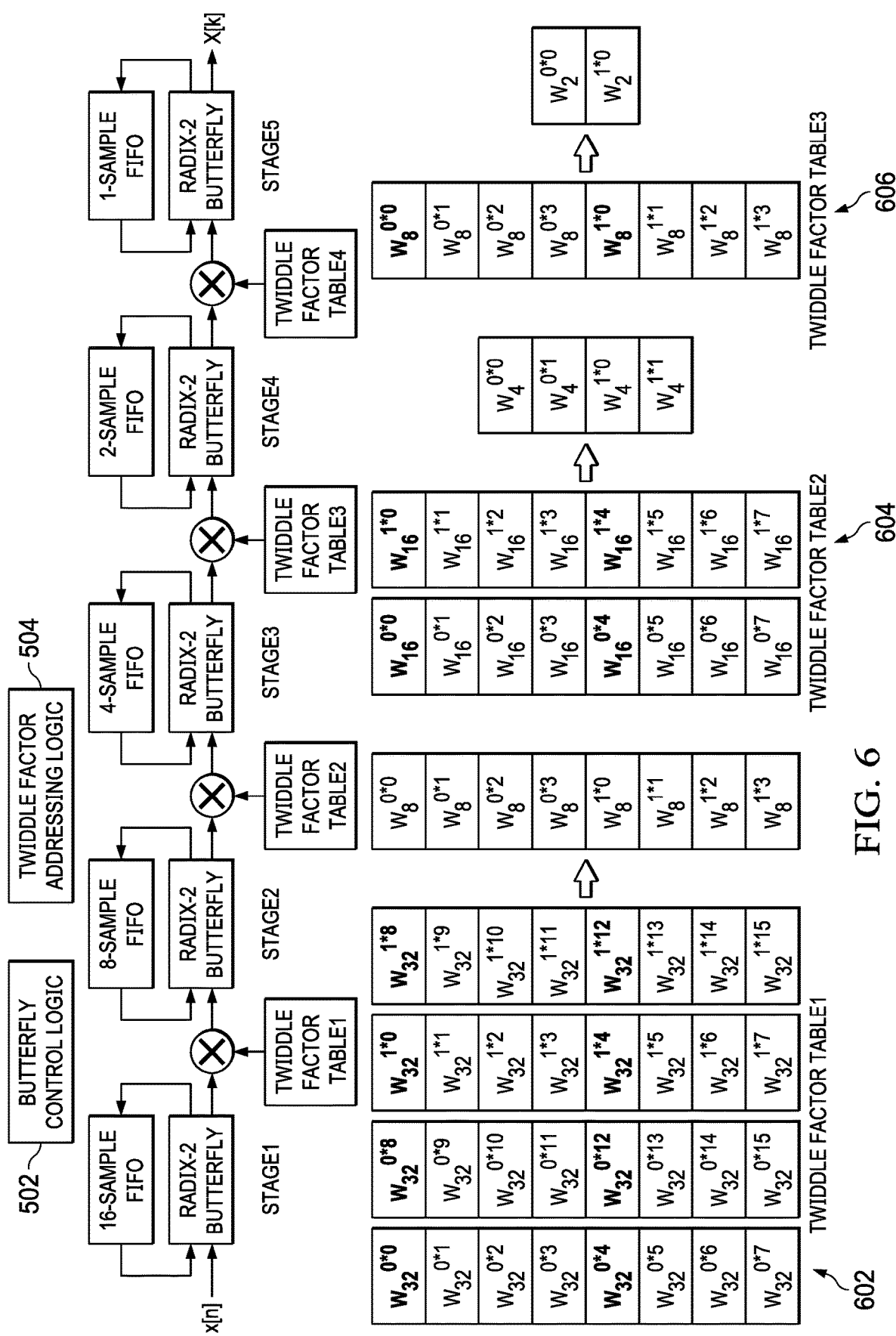
FIG. 6 shows an example of twiddle factor tables applied to the hardware accelerator of FIG. 5a in accordance with various examples.

FIG. 6 shows an exemplary 32-element twiddle factor table 602 for Stage 1, an exemplary 16-element twiddle factor table 604 for Stage 2, and an exemplary 8-element twiddle factor table 606 for Stage 3. The tables 602, 604 are shown in two dimensions for ease of viewing; however, these tables may instead be a 1D array. The elements of the tables 602, 604, 606 are in the shorthand form of $W_N^k$, which equals $e^{-j2\pi k/N}$.

The twiddle factor table 602 is conventionally intended for implementing the first stage of, in this example, a 32-point 1D FFT, and thus the table 602 is adjusted to compensate for the fact that it is being applied to implement the first stage of, in this example, an 8-point 1D FFT. The twiddle factor table 606 corresponds to the table that would conventionally be applied to implement the first stage of an 8-point FFT because it is associated with Stage 3, which is replicated adjacent to the table 602 for ease of viewing.

Dividing both N and k by the same number results in the same twiddle factor value, and thus the first twiddle factor $W_{32}^{0*0}$ of the table 602 can be rewritten as $W_8^{0*0}$ (i.e., the first twiddle factor of the table 606) and $W_{32}^{0*4}$ of the table 602 can be rewritten as $W_8^{0*1}$ (i.e., the second twiddle factor of the table 606). In other words, the twiddle factor tables 602, 604, 606 for the initial group of $\log_2$ M stages 501 are equivalent to the twiddle factor tables for an M-point 1D FFT when selecting every Nth entry after the first entry, represented by the bolded entries.

As explained above, when the twiddle factor table 606 is used for a conventional 8-point 1D FFT (i.e., used as the twiddle factor table 316 for Stage 3), the entries in the table are accessed sequentially on a per cycle basis. However, in the pipelined 2D FFT computation explained with respect to FIG. 5a, the first four add/subtract operations carried out by the butterfly unit 302 of Stage 1 correspond to the first add/subtract operations of each of the N columns, all of which would conventionally be multiplied with the first element of the twiddle factor table 606. Thus, the twiddle factor addressing logic 504 is configured to access the first element in the twiddle factor tables 602, 604, 606 for N cycles. Then, rather than advance through the twiddle factor tables 602, 604, 606 sequentially, the twiddle factor addressing logic 504 is configured to move through the tables by N elements at a time. In the specific example of FIGS. 5 and 6, the twiddle factor addressing logic 504 is configured to access the first entry of table 602 for 4 cycles, the $5^{th}$ entry of table 602 for 4 cycles, the $9^{th}$ entry of table 602 for 4 cycles, and so on. Similarly, with respect to the table 604, the twiddle factor addressing logic 504 is configured to access the first entry of table 604 for 4 cycles, followed by 4 cycles each of accessing the $5^{th}$, $9^{th}$ and $13^{th}$ entries. In this way, the appropriate twiddle factor is applied to the results of the add/subtract operations carried out in the initial group of stages 501 in a manner that corresponds with sequential access per cycle in a conventional 1D FFT computation.

Figure 7A:
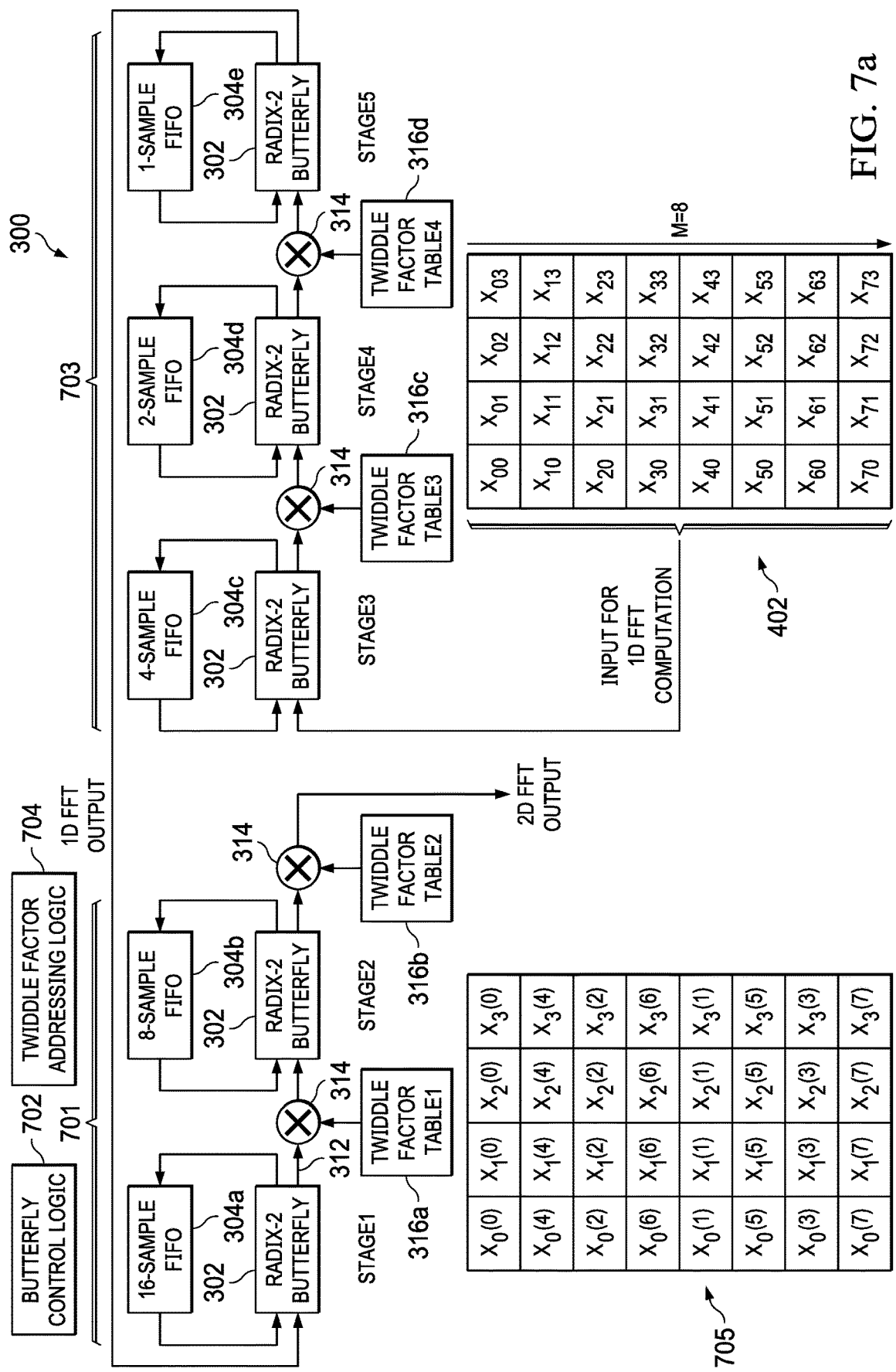
FIG. 7a shows the hardware accelerator of FIG. 3 including additional exemplary control logic in accordance with various examples.

FIG. 7a shows another example of the R2SDF hardware accelerator 300 with modified butterfly control logic 702 and twiddle factor addressing logic 704 in accordance with examples of this disclosure. In particular, the R2SDF hardware accelerator 300 and associated logic 702, 704 are configured to perform a pipelined 2D FFT on an M×N array (e.g., M×N array 402) with a R2SDF hardware accelerator 300 having at least $\log_2$ M×N stages. In the example of FIG. 7a, as in FIGS. 3 and 5, the R2SDF hardware accelerator 300 has five stages, and thus can perform a pipelined 2D FFT for M×N less than or equal to 32. In practice, however, the R2SDF hardware accelerator 300 may include many more stages, and thus is capable of performing a pipelined 2D FFT on larger arrays. For purposes of simplicity, here the R2SDF hardware accelerator 300 includes five stages as above, and the M×N array 402 on which the pipelined 2D FFT is performed is an 8×4 array 402.

In FIG. 7a, the log$_2$ M×N stages of the R2SDF hardware accelerator 300 are split into an initial group of log$_2$N stages and a final group of log$_2$M stages, generally. In this specific example, where the M×N array 402 is an 8×4 array, this results in an initial group of 2 stages 701 and a final group of 3 stages 703. In this example, the final group of stages 703 carries out the M-point 1D FFT, while the initial group of stages 701 receives the output of the final group of stages 703 and carries out the N-point 1D FFT. However, while the final group of stages 703 is configured with appropriate FIFO buffer size to perform the M-point 1D FFT (i.e., stages 3-5 are conventionally designed to carry out a M=8-point 1D FFT in this example), the initial group of stages 701 does not have the proper FIFO buffer size to carry out an N=4-point 1D FFT. For example, Stage 1 would conventionally be the first stage in carrying out a 32-point 1D FFT, while Stage 2 would be the first stage in carrying out a 16-point 1D FFT. Here, however, Stage 1 is used as the first stage to carry out an N=4-point 1D FFT.

Unlike FIG. 5a, in which elements of the M×N array 402 were first provided to the initial group of stages 501 in a transpose fashion, in FIG. 7a the butterfly control logic 502 provides elements of the M×N array 402 to the final group of log$_2$M stages 703 normally, in the M direction of the array 402. Thus, an M-point 1D FFT is first carried out the final group of stages 703, which results in the intermediate array 705, which is bit-reversed in the column direction, but not the row direction. The intermediate array 705 corresponds to the array 404 prior to the application of a bit-reversal algorithm.

Unlike in FIG. 4, where the full 1D FFT had to first be completed, at which point a second N-point 1D FFT was performed across rows by reusing some of the final group of stages 703 (e.g., stages 4 and 5 to compute a 4-point 1D FFT), the output of stage 5 is immediately provided to the initial group of stages 701. The output of stage 5 is fed normally (without transposition) to the input of stage 1. In this example, transposition occurs by virtue of the FIFO buffer size. For example, the first and second columns of 1D FFT output from the final group of stages 703 are stored in the FIFO buffer of stage 1, and thus the first comparison occurs between the first element of the first column (X$_0$(0) from the FIFO buffer) and the first element of the third column (X$_2$(0) from the stage 5 output). The second comparison occurs between the second element of the first column and the second element of the third column, rather than the first element of the second column and the first element of the fourth column as would be the case in a conventional 4-point 1D FFT. Due to this transposition, the output from Stage 2, the last stage in the initial group of stages 701, is a final output array 706 shown in FIG. 7b. The final output array 706 is output in a column-wise direction. Similar to the final output array 506, the final output array 706 is also bit-reversed in both dimensions. Thus, a 2D bit-reversal algorithm may be applied to the final output array 706 before further processing (e.g., to determine an angle-of-arrival of an object in FMCW radar system 100).

Although the example of FIG. 7a is described with respect to an 8×4 input array 402, the approach described with respect to FIG. 7a is adaptable to other array sizes as well, by tapping in to various stages as inputs (e.g., using a mux) and tapping out from various stages as outputs (e.g., using a mux). For example, a 4×4 input array could be fed into Stage 4, where Stages 4-5 perform a 4-point 1D FFT, the output of which is fed back to Stage 2 as input, where Stages 2-3 perform the second 4-point 1D FFT, the output of which is the final output array. Similarly, an 8×2 input array could be fed into Stage 3, where Stages 3-5 perform an 8-point 1D FFT, the output of which is fed back to Stage 2 as input, where Stage 2 performs the 2-point 1D FFT, the output of which is the final output array. The butterfly control logic 702 controls the input and output of each stage to achieve the foregoing adaptable dimensions for 2D FFT computation.

While FIG. 7a demonstrates how the butterfly control logic 702 providing elements from the M×N array 402 first to the final group of log$_2$ M stages 703 and then providing that output to the initial group of log$_2$N stages allows for pipelined computation of a 2D FFT, the twiddle factor tables 316 for the initial group of stages 701, which are commonly stored in ROM, are designed for M×N-point 1D FFT computation. Thus, additional twiddle factor addressing logic 704 modifies the addressing of these twiddle factor tables 316 in the initial group of stages 701 to compensate for this disparity.

Figure 8:
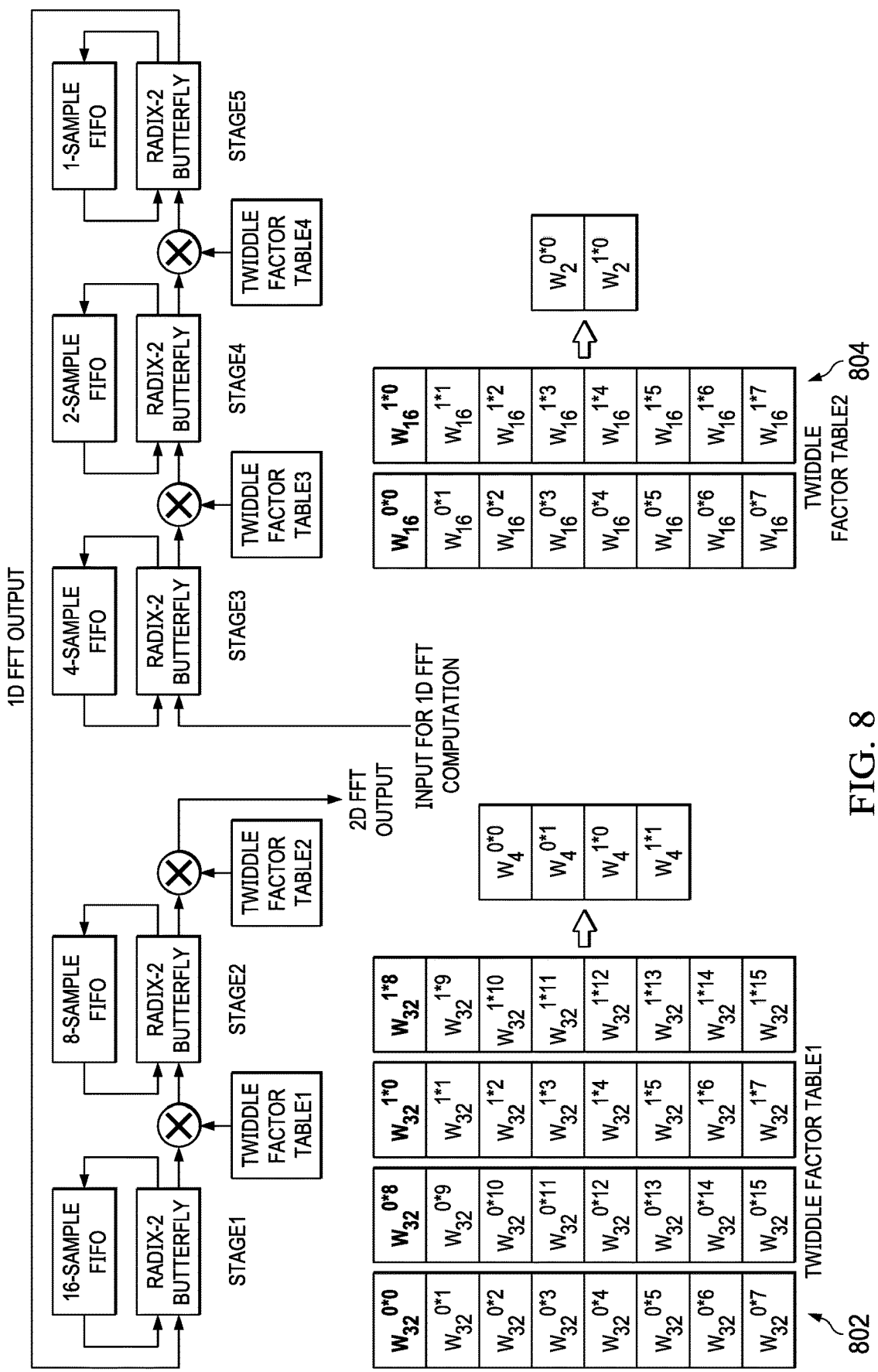
FIG. 8 shows another example of twiddle factor tables applied to the hardware accelerator of FIG. 7a in accordance with various examples.

FIG. 8 shows an exemplary 32-element twiddle factor table 802 for Stage 1 and an exemplary 16-element twiddle factor table 804 for Stage 2. The tables 802, 804 are shown in two dimensions for ease of viewing; however, these tables may instead be a 1D array. The elements of the tables 802, 804 are in the shorthand form of $W_N^k$, which equals $e^{-j2\pi k/N}$.

As above in FIG. 6, the twiddle factor table 802 is conventionally intended for implementing the first stage of, in this example, a 32-point 1D FFT, and thus the table 802 is adjusted to compensate for the fact that it is being applied to implement the first stage of, in this example, a 4-point 1D FFT. Similarly, the table 804 is adjusted to compensate for the fact that is it being applied to implement the second stage of, in this example, a 4-point 1D FFT rather than the second stage of a 32-point 1D FFT.

Dividing both N and k by the same number results in the same twiddle factor value, and thus the first twiddle factor $W_{32}^{0*0}$ of the table 802 can be rewritten as $W_4^{0*0}$ (i.e., the first twiddle factor of a table for the first stage of a 4-point 1D FFT) and $W_{32}^{0*8}$ of the table 802 can be rewritten as $W_4^{0*1}$ (i.e., the second twiddle factor of the table for the first stage of a 4-point 1D FFT). In other words, the twiddle factor tables 802, 804 for the initial group of log$_2$ N stages 701 are equivalent to the twiddle factor tables for an N-point 1D FFT when selecting every Mth entry after the first entry, represented by the bolded entries.

As explained above, the entries in the twiddle factor table are accessed sequentially on a per cycle basis. However, in the pipelined 2D FFT computation explained with respect to FIG. 7a, the first eight add/subtract operations carried out by the butterfly unit 302 of Stage 1 correspond to the first add/subtract operations of each of the M columns, all of which would conventionally be multiplied with the first element of the twiddle factor table for an N-point 1D FFT. Thus, the twiddle factor addressing logic 704 is configured to access the first element in the twiddle factor tables 802, 804 for M cycles. Then, rather than advance through the twiddle factor tables 802, 804 sequentially, the twiddle factor addressing logic 704 is configured to move through the tables by M elements at a time. In the specific example of FIGS. 7 and 8, the twiddle factor addressing logic 704 is configured to access the first entry of table 802 for 8 cycles, the 9$^{th}$ entry of table 802 for 8 cycles, the 17$^{th}$ entry of table 802 for 8 cycles, and so on. Similarly, with respect to the table 804, the twiddle factor addressing logic 704 is configured to access the first entry of table 804 for 8 cycles, followed by 8 cycles of accessing the 9$^{th}$ entry. In this way, the appropriate twiddle factor is applied to the results of the add/subtract operations carried out in the initial group of stages 701 in a manner that corresponds with sequential access per cycle in a conventional 1D FFT computation.

Figure 9:
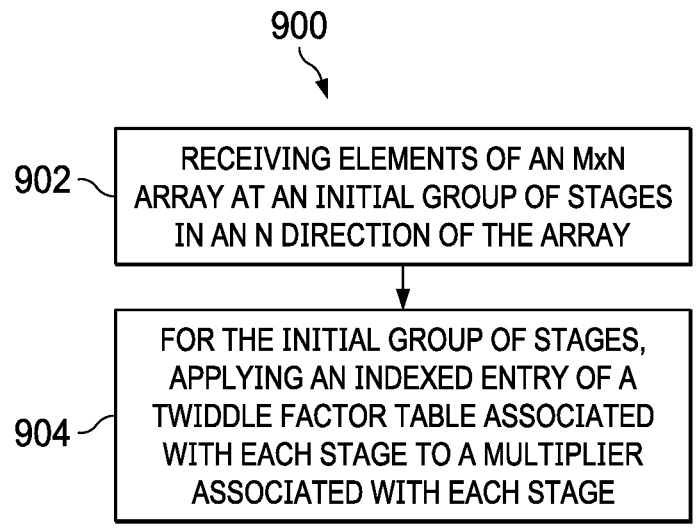
FIG. 9 shows a flow chart of a method for performing a two-dimensional fast Fourier transform in accordance with various examples.

FIG. 9 shows a method 900 for performing a 2D FFT on an M×N element array using a hardware accelerator such as the R2SDF hardware accelerator 300 explained above. As explained, the R2SDF hardware accelerator 300 has at least $\log_2$ M×N stages and includes an initial group of $\log_2$ M stages and a final group of $\log_2$ N stages. The method 900 begins in block 902 with receiving elements of the M×N array at the initial group of stages in an N direction of the array. For example, rather than performing an M-point 1D FFT by providing elements of the M×N array in the M direction of the array, in this example the elements are received at the initial group of stages in the N (or transpose to M) direction of the array.

The method 900 continues in block 904 with, for the initial group of stages, applying an indexed entry of a twiddle factor table associated with each stage to a multiplier associated with each stage. As explained above, when a twiddle factor table is used for a conventional 1D FFT, the entries in the table are accessed sequentially on a per cycle basis. However, in the method 900, the twiddle factor tables are accessed (e.g., by twiddle factor addressing logic 504) such that the first element in the twiddle factor tables is utilized for N cycles. Then, rather than advancing through and applying the elements of twiddle factor tables sequentially, the method 900 applies an index to advance through and apply the elements of the twiddle factor tables by N elements at a time. In this way, the appropriate twiddle factor is applied to the results of the initial group of stages in a manner that corresponds with sequential access per cycle in a conventional 1D FFT computation.

Figure 10:
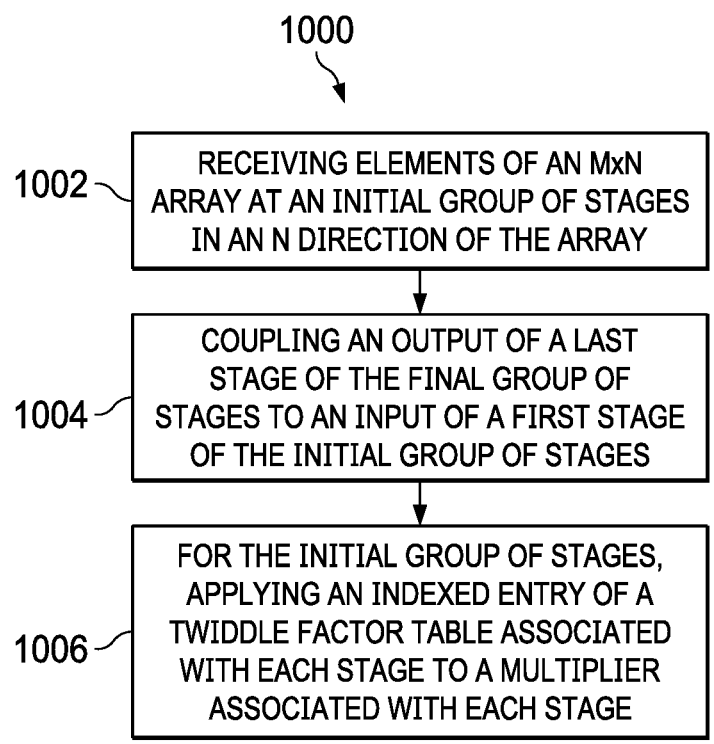
FIG. 10 shows a flow chart of another method for performing a two-dimensional fast Fourier transform in accordance with various examples.

FIG. 10 shows a method 1000 for performing a 2D FFT on an M×N element array using a hardware accelerator such as the R2SDF hardware accelerator 300 explained above. As explained, the R2SDF hardware accelerator 300 has at least $\log_2$ M×N stages and includes an initial group of $\log_2$ N stages and a final group of $\log_2$ M stages. The method 1000 begins in block 1002 with receiving elements of the M×N array at the final group of stages in an M direction of the array. Unlike above, in which elements of the M×N array were first received by the initial group of stages in a transpose fashion, in the method 1000, elements of the M×N array are received by the final group of $\log_2$ M stages normally, in the M direction of the M×N array. Thus, an M-point 1D FFT is first carried out the final group of stages.

The method 1000 continues in block 1004 with coupling an output of a last stage of the final group of stages to an input of a first stage of the initial group of stages. Then, for the initial group of stages, the method 1000 continues in block 1006 with applying an indexed entry of a twiddle factor table associated with each stage to a multiplier associated with each stage. As explained above, when a twiddle factor table is used for a conventional 1D FFT, the entries in the table are accessed sequentially on a per cycle basis. However, in the method 1000, the twiddle factor tables are accessed (e.g., by twiddle factor addressing logic 504) such that the first element in the twiddle factor tables is utilized for M cycles. Then, rather than advancing through and applying the elements of twiddle factor tables sequentially, the method 1000 applies an index to advance through and apply the elements of the twiddle factor tables by M elements at a time. In this way, the appropriate twiddle factor is applied to the results of the initial group of stages in a manner that corresponds with sequential access per cycle in a conventional 1D FFT computation.

At times, this disclosure makes reference to "rows" or "columns". These references are for the sake of ease of understanding of the accompanying figures, and it should be appreciated that the particular directionality of data or an array is not important. That is, M could refer to a number of rows or columns, while N could refer to a number of columns or rows, respectively.

In the foregoing discussion and in the claims, reference is made to hardware accelerators including various elements, sections, and stages. It should be appreciated that these elements, sections, and stages, as the case may be, correspond to hardware circuitry, for example implemented on an integrated circuit (IC). Indeed, in at least one example, the entire hardware accelerator for performing a 2D FFT is implemented on an IC.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   a hardware accelerator configured to perform a two-dimensional (2D) fast Fourier transform (FFT) on an M×N element array, where M and N are integer multiples of two, the hardware accelerator comprising:
   log 2 M×N pipeline stages comprising an initial group of at least one log 2 M stage and a final group of at least one log 2 N stage, each stage comprising:
   a butterfly unit;
   a first-in first-out (FIFO) buffer coupled to the butterfly unit; and
   a multiplier coupled to the butterfly unit and to an associated twiddle factor table;

butterfly control logic configured to provide elements of the M×N element array to the initial group of stages in a first direction of the array; and twiddle factor addressing logic configured to, for the twiddle factor tables of the initial group of stages:
apply an indexed entry of the twiddle factor table to the associated multiplier;
wherein the indexed entry begins as a first entry and advances by N entries after every N cycles.

2. The system of claim 1, further comprising a radar antenna array in azimuth and elevation directions, wherein the radar antenna array comprises M antennas in one of the azimuth and elevation directions and comprises N antennas in the other of the azimuth and elevation directions.

3. The system of claim 2, wherein each element of the M×N array comprises amplitude and phase values for a particular azimuth-elevation antenna pair that correspond to a range-Doppler FFT peak.

4. The system of claim 1, wherein the butterfly unit comprises a Radix-2 butterfly unit.

5. The system of claim 1, wherein an output of the final group of stages comprises the 2D FFT.

6. A system, comprising:
a hardware accelerator configured to perform a two-dimensional (2D) fast Fourier transform (FFT) on an M×N element array, comprising:
log 2 M×N pipeline stages comprising an initial group of at least one log 2 N stage and a final group of at least one log 2 M stage, where M and N are integer multiples of two, each stage comprising:
a butterfly unit;
a first-in first-out (FIFO) buffer coupled to the butterfly unit; and
a multiplier coupled to the butterfly unit and to an associated twiddle factor table;
butterfly control logic configured to provide elements of the M×N array to the final group of stages in a first direction of the array, wherein an output of a last stage of the final group of stages is provided as an input to a first stage of the initial group of stages; and
twiddle factor addressing logic configured to, for the twiddle factor tables of the initial group of stages:
apply an indexed entry of the twiddle factor table to the associated multiplier;
wherein the indexed entry begins as a first entry and advances by M entries after every M cycles.

7. The system of claim 6, further comprising a radar antenna array in azimuth and elevation directions, wherein the radar antenna array comprises M antennas in one of the azimuth and elevation directions and comprises N antennas in the other of the azimuth and elevation directions.

8. The system of claim 7, wherein each element of the M×N array comprises amplitude and phase values for a particular azimuth-elevation antenna pair that correspond to a range-Doppler FFT peak.

9. The system of claim 6, wherein the butterfly unit comprises a Radix-2 butterfly unit.

10. The system of claim 6, wherein an output of the initial group of stages comprises the 2D FFT.

11. A method for performing a two-dimensional (2D) fast Fourier transform (FFT) on an M×N element array using a hardware accelerator comprising log 2 M×N stages comprising an initial group of at least one log 2 M stage and a final group of at least one log 2 N stage, where M and N are integer multiples of two, the method comprising:
receiving elements of the M×N array at the initial group of stages in a first direction of the array;
receiving elements of the M×N array at the final group of stages in a second direction of the array;
for the initial group of stages, applying an indexed entry of a twiddle factor table associated with each stage to a multiplier associated with each stage;
wherein the indexed entry begins as a first entry and advances by N entries after every N cycles; and
coupling the hardware accelerator to a radar antenna array having antennas arranged in azimuth and elevation directions, wherein the radar antenna array comprises M antennas in one of the azimuth and elevation directions and comprises N antennas in the other of the azimuth and elevation directions.

12. The method of claim 11, wherein each element of the M×N array comprises amplitude and phase values for a particular azimuth-elevation antenna pair that correspond to a range-Doppler FFT peak.

13. The method of claim 11, wherein an output of the final group of stages comprises the 2D FFT.

14. A method for performing a two-dimensional (2D) fast Fourier transform (FFT) on an M×N element array using a hardware accelerator comprising log 2 M×N stages comprising an initial group of at least one log 2 N stage and a final group of at least one log 2 M stage, where M and N are integer multiples of two, the method comprising:
receiving elements of the M×N array at the final group of stages in a first direction of the array;
coupling an output of a last stage of the final group of stages to an input of a first stage of the initial group of stages;
for the initial group of stages, applying an indexed entry of a twiddle factor table associated with each stage to a multiplier associated with each stage;
wherein the indexed entry begins as a first entry and advances by M entries after every M cycles; and
coupling the hardware accelerator to a radar antenna array having antennas arranged in azimuth and elevation directions, wherein the radar antenna array comprises M antennas in one of the azimuth and elevation directions and comprises N antennas in the other of the azimuth and elevation directions.

15. The method of claim 14, wherein each element of the M×N array comprises amplitude and phase values for a particular azimuth-elevation antenna pair that correspond to a range-Doppler FFT peak.

16. The method of claim 14, wherein an output of the initial group of stages comprises the 2D FFT.

* * * * *